L. E. INGERSOLL.

Improvement in Animal-Traps.

No. 127,887.  Patented June 11, 1872.

Witnesses:  Inventor:
Lewis E. Ingersoll
PER
Attorneys.

UNITED STATES PATENT OFFICE.

LEWIS E. INGERSOLL, OF COLUMBUS, PENNSYLVANIA.

IMPROVEMENT IN ANIMAL-TRAPS.

Specification forming part of Letters Patent No. 127,887, dated June 11, 1872.

Specification describing an Animal-Trap, invented by LEWIS E. INGERSOLL, of Columbus, in the county of Warren and State of Pennsylvania.

The invention consists in the mode of operating a vibrating partition, which divides a chamber into two compartments, in each of which one animal may be alternately caught and delivered into a rear chamber, while the trap is set automatically and alternately in each room a given number of times, or until the tension of a spring and cord has been exhausted.

Figure 1:
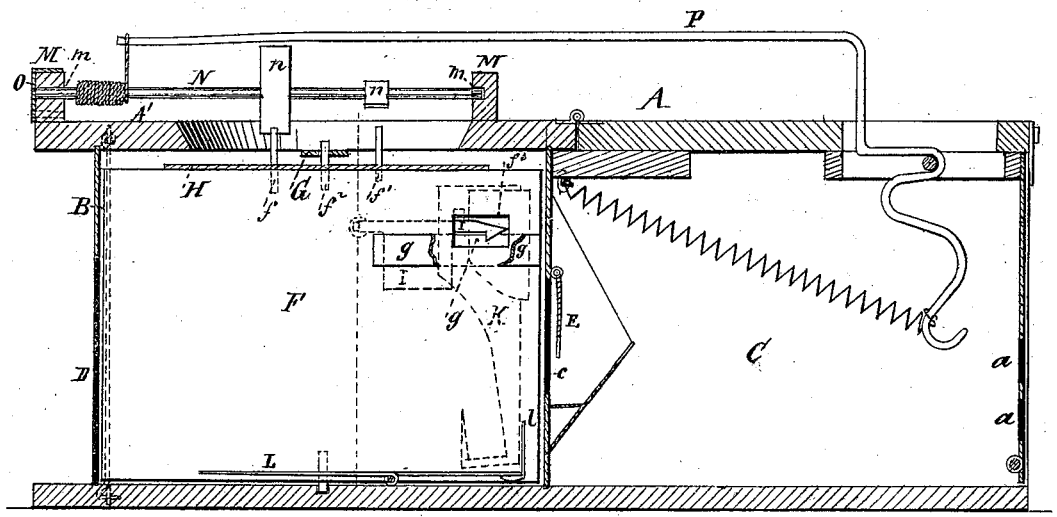
Figure 2:
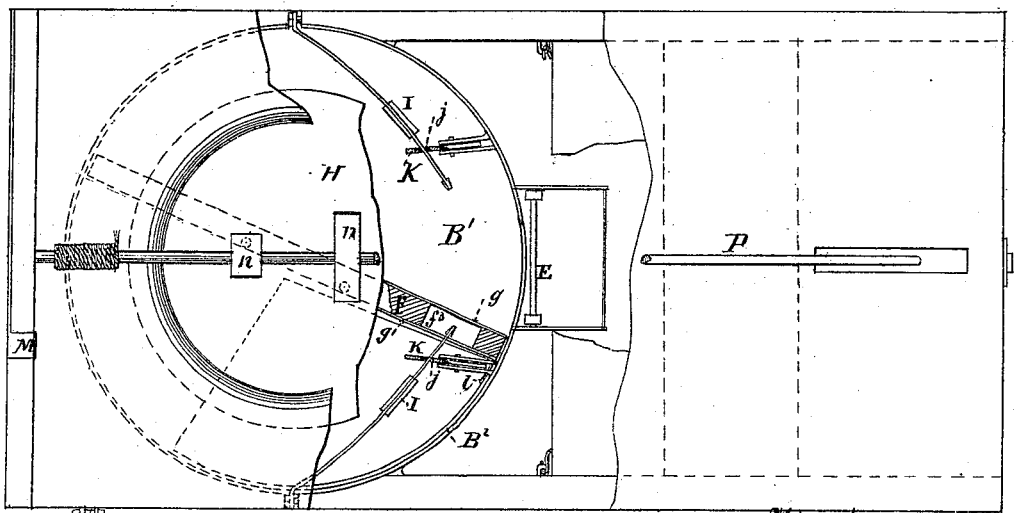

Figure 1 is a longitudinal vertical section, and Fig. 2 a top view with parts broken out.

A is a box, formed of any suitable shape or material, consisting of a front chamber, B, having entrance and rear chamber C. About midway between these chambers B C is a hole, $c$, large enough for the passage of the animal to be caught, and covered by a flap, E, that is hinged in rear chamber, and more or less cut away. The rear side of box A is a hinged door, and is provided with apertures $a$, by which the chamber C is lighted. The light therefrom is transmitted through the cut-away parts of flap E, and readily attracts any animal that has been caught in one of the front chambers. The front chamber B is divided into two sections, $B^1$ $B^2$, by a pivoted and vibratory partition, F. This partition has a pivot or journal on the middle of bottom edge, which turns on a bearing in the center of bottom of chamber B, while it has on top three pins, $f$ $f^1$ $f^2$. The central pin $f^2$ is a journal, which turns in a bearing of plate G. H is a horizontal disk, which may form a part of top of chamber B and turn with the partition F. This partition F has also a recess, $f^3$, partially covered by two opposite slats, $g$ $g$. I I are two pivoted catches, weighted, and held in slots $j$ $j$ of the shanks of pivoted bait-hooks K K. L is a pivoted platform, which is slightly weighted on the rear side, on which it is expected to rest. This has an upward projection, $l$, that raises the hook. The front A' of box A is hinged, and provided on top with two transverse pieces, M M, having the bearings $m$ $m$ for shaft N. This shaft N has two pairs of wings, $n$ $n$, at right angles to each other, and it receives a cord which is wound upon it. This shaft, being placed in its bearings $m$ $m$, is prevented from sliding laterally by guard-plate O. P is a lever, attached by a hook to the spring Q in rear chamber C.

The operation is as follows: The rear part of lever P being attached to its spring, the end of cord that is wound up on the shaft is fastened to the forward end of lever. The spring continually tends to unwind the cord from shaft N, while one of the wings catches against a pin, $f$ or $f^1$, which projects from partition F. The partition is held fast by one of the catches I until an animal brings his weight to bear upon the platform or pulls upon the bait-hook. The latches being then raised, the tension of spring unwinds a portion of cord from shaft N, one of whose wings carries the partition round and locks it, while its other wing catches against the opposite pin $f$ or $f^1$. Every vibration of this partition changes the opening D from one to the other of chambers $B^1$ $B^2$. The animal, finding himself inclosed in one of these chambers, and noticing the light shining from rear chamber through the intermediate hole, passes therethrough and allows the flap-door to close behind him. Here he is effectually caged, while the trap is automatically set for another. This alternate setting and closing of the chambers will continue until the spring has spent its force or unwound all the cord from shaft N.

Having thus described my invention, what I claim as new, and desire to secure by Letters Patent, is—

1. The combination, with partition F having the pin $f$ $f^1$, of the shaft N with cord and wings thereon, the lever P, and the spring Q, all arranged to vibrate said partition at the times and in the manner set forth.

2. In combination with the devices of the above claim, the pivoted catches I, suspended bait-hooks, and pivoted platforms, all arranged as shown and described.

LEWIS E. INGERSOLL.

Witnesses:
SOLON C. KEMON,
CHAS. A. PETTIT.